US010893571B2

(12) United States Patent
Sadiq et al.

(10) Patent No.: US 10,893,571 B2
(45) Date of Patent: Jan. 12, 2021

(54) RADIO LINK MONITORING BASED ON DISCONTINUOUS RECEPTION MODE

(71) Applicant: QUALCOMM Incorporated, San Diego, CA (US)

(72) Inventors: Bilal Sadiq, Basking Ridge, NJ (US); Peter Gaal, San Diego, CA (US); Heechoon Lee, San Diego, CA (US); Wanshi Chen, San Diego, CA (US); Tingfang Ji, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 16/170,369

(22) Filed: Oct. 25, 2018

(65) Prior Publication Data
US 2019/0159279 A1 May 23, 2019

Related U.S. Application Data

(60) Provisional application No. 62/587,979, filed on Nov. 17, 2017.

(51) Int. Cl.
*H04W 76/28* (2018.01)
*H04W 72/04* (2009.01)
(Continued)

(52) U.S. Cl.
CPC ......... *H04W 76/28* (2018.02); *H04W 72/042* (2013.01); *H04W 36/0088* (2013.01); *H04W 36/30* (2013.01); *H04W 48/16* (2013.01)

(58) Field of Classification Search
CPC ... H04W 76/28; H04W 72/042; H04W 48/16; H04W 36/0088; H04W 36/30;
(Continued)

(56) References Cited

U.S. PATENT DOCUMENTS 10,484,890 B2* 11/2019 Lin .................... H04L 5/0007
10,484,931 B2* 11/2019 Dinan ................. H04W 48/10
(Continued)

FOREIGN PATENT DOCUMENTS

WO       2012057532 A2    5/2012

OTHER PUBLICATIONS

International Search Report and Written Opinion—PCT/US2018/057834—ISA/EPO—dated Jan. 31, 2019.
(Continued)

*Primary Examiner* — Sharad Rampuria
(74) *Attorney, Agent, or Firm* — QUALCOMM Incorporated

(57) ABSTRACT

Certain aspects of the present disclosure provide techniques for performing, by a user equipment (UE), radio link monitoring based on discontinuous reception mode operation of the UE. Certain aspects provide a method for wireless communication. The method generally includes operating, at a user equipment (UE), in a discontinuous reception (DRX) mode of operation. The method further includes evaluating, by the UE, link quality between the UE and a base station (BS) at least once every time period, wherein the time period is based on a length of a DRX cycle of the UE operating in the DRX mode of operation and a reference signal (RS) period, wherein the BS is configured to transmit RS periodically every RS period.

30 Claims, 9 Drawing Sheets

(51) Int. Cl.
*H04W 36/00* (2009.01)
*H04W 48/16* (2009.01)
*H04W 36/30* (2009.01)

(58) Field of Classification Search
CPC ..... H04W 72/04; H04W 72/12; H04W 76/00; H04B 7/2121; H04B 7/2123; H04J 2203/0069; H04Q 2213/394
See application file for complete search history.

(56) References Cited

U.S. PATENT DOCUMENTS

| | | | |
|---|---|---|---|
| 2012/0108177 A1* | 5/2012 | Miao | H04W 24/08 455/67.11 |
| 2015/0043515 A1 | 2/2015 | Zhang et al. | |
| 2015/0126206 A1* | 5/2015 | Krishnamurthy | H04W 76/18 455/452.1 |
| 2018/0262937 A1* | 9/2018 | Lee | H04B 17/309 |

OTHER PUBLICATIONS

Samsung: "Discussion on RLM for Time-Domain eICIC", 3GPP Draft; R4-104161, 3rd Generation Partnership Project (3GPP), Mobile Competence Centre ; 650, Route Des Lucioles ; F-06921 Sophia-Antipolis Cedex ; France, vol. RAN WG4, No. Jacksonville; Nov. 15, 2010, Nov. 12, 2010, XP050499813, 6 pages.

Samsung: "Radio Link Monitoring Evaluation Period for DRX for eICIC", 3GPP Draft; R4-111950, 3rd Generation Partnership Project (3GPP), Mobile Competence Centre, 650, Route Des Lucioles, F-06921 Sophia-Antipolis Cedex, France, vol. RAN WG4, No. Shanghai, China; Apr. 11, 2011, Apr. 6, 2011, XP050501942, [retrieved on Apr. 6, 2011], 2 pages.

* cited by examiner

RADIO LINK MONITORING BASED ON DISCONTINUOUS RECEPTION MODE

CROSS-REFERENCE TO RELATED APPLICATIONS

This application claims the benefit of U.S. Provisional Patent No. 62/587,979, filed Nov. 17, 2017. The content of the provisional application is hereby incorporated by reference in its entirety.

INTRODUCTION

Aspects of the present disclosure relate to wireless communications, and more particularly, to techniques for performing, by a user equipment (UE), radio link monitoring based on discontinuous reception mode operation of the UE.

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include Long Term Evolution (LTE) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method for wireless communication. The method generally includes operating, at a user equipment (UE), in a discontinuous reception (DRX) mode of operation. The method further includes evaluating, by the UE, link quality between the UE and a base station (BS) at least once every time period, wherein the time period is based on a length of a DRX cycle of the UE operating in the DRX mode of operation and a reference signal (RS) period, wherein the BS is configured to transmit RS periodically every RS period.

Certain aspects provide a user equipment (UE) comprising a memory and a processor coupled to the memory. The processor is configured to operate the UE in a discontinuous reception (DRX) mode of operation. The processor is configured to evaluate link quality between the UE and a base station (BS) at least once every time period, wherein the time period is based on a length of a DRX cycle of the UE operating in the DRX mode of operation and a reference signal (RS) period, wherein the BS is configured to transmit RS periodically every RS period.

Certain aspects provide a user equipment (UE). The UE includes means for operating the UE in a discontinuous reception (DRX) mode of operation. The UE further includes means for evaluating link quality between the UE and a base station (BS) at least once every time period, wherein the time period is based on a length of a DRX cycle of the UE operating in the DRX mode of operation and a reference signal (RS) period, wherein the BS is configured to transmit RS periodically every RS period.

Certain aspects provide a non-transitory computer readable storage medium that stores instructions that when executed by a user equipment (UE) cause the UE to perform a method for wireless communication. The method includes operating, at the UE, in a discontinuous reception (DRX) mode of operation. The method further includes evaluating, by the UE, link quality between the UE and a base station (BS) at least once every time period, wherein the time period is based on a length of a DRX cycle of the UE operating in the DRX mode of operation and a reference signal (RS) period, wherein the BS is configured to transmit RS periodically every RS period.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
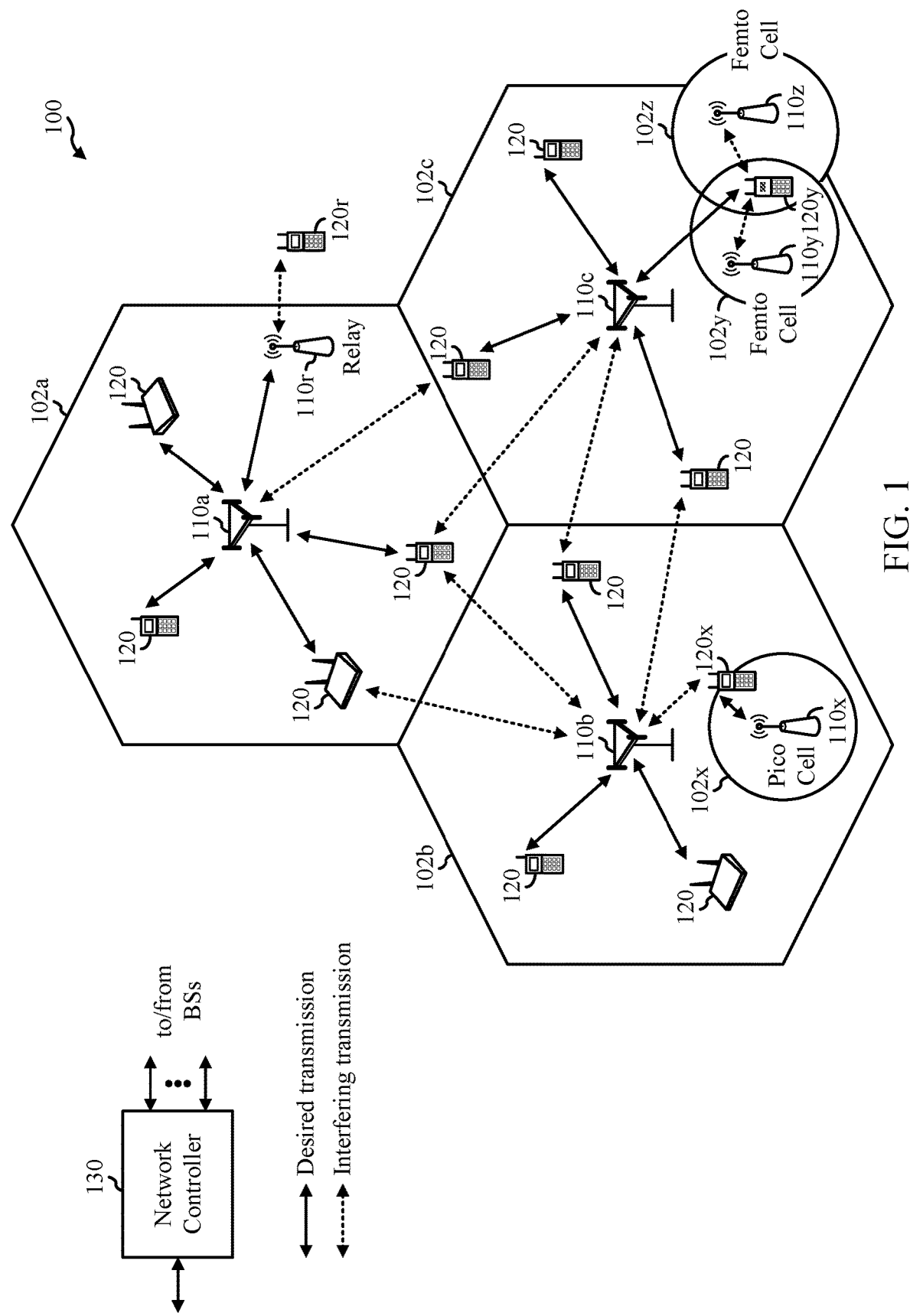
FIG. 1 is a block diagram conceptually illustrating an example telecommunications system, in accordance with certain aspects of the present disclosure.

Aspects of the present disclosure provide apparatus, methods, processing systems, and computer readable mediums for NR (new radio access technology or 5G technologies).

NR may support various wireless communication services, such as Enhanced mobile broadband (eMBB) targeting wide bandwidth (e.g. 80 MHz or beyond), millimeter wave (mmW) targeting high carrier frequency (e.g. 25 GHz or beyond), massive MTC (mMTC) targeting non-backward compatible MTC techniques, and/or mission critical targeting ultra reliable low latency communications (URLLC). These services may include latency and reliability requirements. These services may also have different transmission time intervals (TTI) to meet respective quality of service (QoS) requirements. In addition, these services may co-exist in the same subframe. In LTE, the basic transmission time interval (TTI) or packet duration is 1 subframe. In NR, a subframe may still be 1 ms, but the basic TTI may be referred to as a slot. A subframe may contain a variable number of slots (e.g., 1, 2, 4, 8, 16, . . . slots) depending on the tone-spacing (e.g., 15, 30, 60, 120, 240 . . . kHz).

Aspects of the present disclosure relate to performing, by a user equipment (UE), radio link monitoring (RLM) based on discontinuous reception (DRX) mode operation of the UE. For example, a UE may be configured to use at least one reference signal (RS) (e.g., synchronization signal block (SSB) (also referred to as a synchronization signal/physical broadcast channel (SS/PBCH) block), secondary synchronization signal (SSS), physical broadcast channel (PBCH) block, demodulation reference signal (DMRS) of PBCH, and/or a channel state information reference signal (CSI-RS)) transmitted by a base station (BS) to perform RLM.

RLM may refer to the UE using the RS as a reference for estimating link quality between the UE and the BS. For example, the UE may use the RS to perform channel measurements (e.g., reference signal received power (RSRP), reference signal received quality (RSRQ), signal to interference plus noise ratio (SINR), estimated block error ratio (BLER), etc.) of a channel (e.g., control channel, downlink control channel, etc.) between the UE and the BS. The UE may use the RS to determine whether a link is in-sync (e.g., active link) or out-of-sync (e.g., radio link failure (RLF)) between the UE and the BS. The UE may use the RS to determine whether it is in-service (e.g., in the service area/cell of) or out-of-service (e.g., out of the service area/cell of) with the BS. The UE may use the RS to determine whether to initiate a cell search to find a BS to connect to, whether to perform a cell reselection to connect to a new BS, whether to perform a handover, etc. In certain aspects, the RS used for performing RLM may be referred to as RLM RS. In certain aspects, the BS may be configured to transmit RLM RS periodically (e.g., roughly periodically), such as every 5, 10, 20, 40, 80, 160 . . . ms. The time period between RLM RS transmission may be referred to as the RLM RS period.

In certain aspects, the UE may be able to operate in an ON or active state or one or more low power states (e.g., OFF or sleep states) and support discontinuous reception (DRX) (e.g., connected mode DRX (cDRX)). For example, in some aspects, the UE may (e.g., cyclically) switch between one or more designated active periods where the UE is supposed to be in an ON or active state (e.g., to monitor downlink channels (e.g., physical downlink control channel (PDCCH)) between the UE and the BS)) and one or more designated sleep periods (wherein the UE can be in an OFF or sleep state (e.g., to stop monitoring downlink channels)) according to DRX cycles, where the UE supports DRX. The UE may support a long DRX cycle, and optionally may also support a short DRX cycle (e.g., if the UE is configured for the short DRX cycle). A DRX cycle may refer to a one cycle of an ON state and a possibility of OFF state of the UE. The short DRX cycle may be a shorter time period than the long DRX cycle, and the OFF state of long DRX cycle may commence after a multiple of the short DRX cycle.

DRX may be configured (e.g., by the BS) at the UE as a set of DRX parameters. The DRX parameters may include an inactivity timer, a short DRX cycle parameter, a DRX short cycle timer, a long DRX cycle start offset, an on duration timer, etc.

The inactivity timer may specify a time period (e.g., in ms, number of subframes, number of slots, etc.) for which the UE should remain in the ON state after successfully monitoring and decoding a downlink channel (e.g., PDCCH) that indicates (e.g., using a PDCCH grant) there is a new transmission (e.g., UL or DL) scheduled between the UE and the BS. The UE may restart the inactivity timer each time the UE receives an indication for a new transmission while in the ON state. When the timer expires, the UE may enter the OFF state. The inactivity timer may be applicable to both the long DRX cycle and the short DRX cycle.

The short DRX cycle parameter may indicate the length (e.g., in ms, number of subframes, number of slots, etc.) of a short DRX cycle, which includes a time the UE is in the ON state followed by a time the UE is possibly in the OFF state.

The DRX short cycle timer indicates a number of short DRX cycles the UE should enter (e.g., following an initial short DRX cycle) before entering a long DRX cycle.

The long DRX cycle start offset indicates the length (e.g., in ms, number of subframes, number of slots, etc.) of a long DRX cycle, which includes a time the UE is in the ON state followed by a time the UE is possibly in the OFF state, and optionally includes the starting subframe/slot for the long DRX cycle.

The on duration timer indicates the length (e.g., in ms, number of subframes, number of slots, etc.) the UE will be in the ON state before entering the OFF state for a DRX cycle. The on duration timer may be applicable to both the long DRX cycle and the short DRX cycle.

The UE may also enter the OFF state (e.g., while the on duration timer and/or inactivity timer have not yet expired) based on receiving an explicit command to enter the OFF state from a network node (e.g., the BS) (e.g., in a media access control (MAC) control element (MAC-CE)).

In certain aspects, such as in NR, the time period of the DRX cycle (e.g., long and/or short) may be configurable (e.g., over a wide range, such as 4 ms to a few seconds).

For example, the UE may at the start of an initial short DRX cycle enter an ON state, and the on duration timer and the inactivity timer for the short DRX cycle may be started. Once both timers have expired, the UE may enter the OFF state. At the end of the short DRX cycle, a new DRX cycle may start (e.g., another short DRX cycle or a long DRX cycle based on the DRX short cycle timer). The on duration timer and the inactivity timer may be restarted for the DRX cycle. Once both timers have expired, the UE may enter the OFF state. Accordingly, the UE may periodically cycle between the ON state and OFF state according to the DRX configuration of the UE.

As a result, the UE may need to use certain techniques as described in further detail herein to perform channel estimation to account for differences in the periodicities of the RLM RS transmissions and DRX cycle. In certain aspects, the UE may be configured to perform RLM based on the DRX configuration of the UE. For example, when the UE can perform RLM may be based on both the periodicity with which the BS transmits RLM RS, and the DRX cycles of the UE when the UE is in an ON state and able to receive the RLM RS.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless communication network 100 in which aspects of the present disclosure may be performed. For example, the wireless network may be a new radio (NR) or 5G network. NR wireless communication systems may employ short uplink bursts. As described herein, for example, UE 120 may perform RLM based on a periodicity with which BS 110 transmits RLM RS and a DRX configuration of UE 120.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile BS. In some examples, the base stations may be interconnected to one another and/or to one or more other BSs or network nodes (not shown) in the wireless communication network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a cyclic prefix (CP) on the uplink and downlink and include support for half-duplex operation using time division duplexing (TDD). A single component carrier (CC) bandwidth of 100 MHz may be supported. NR resource blocks may span 12 subcarriers with a subcarrier bandwidth of 75 kHz over a 0.1 ms duration. Each radio frame may consist of 2 half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such central units (CUs) and/or distributed units (DUs).

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a CU or DU) can configure the cells. DCells may be cells used for carrier aggregation or dual connectivity, but not used for initial access, cell selection/reselection, or handover. In some cases DCells may not transmit synchronization signals (SS), but in some cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
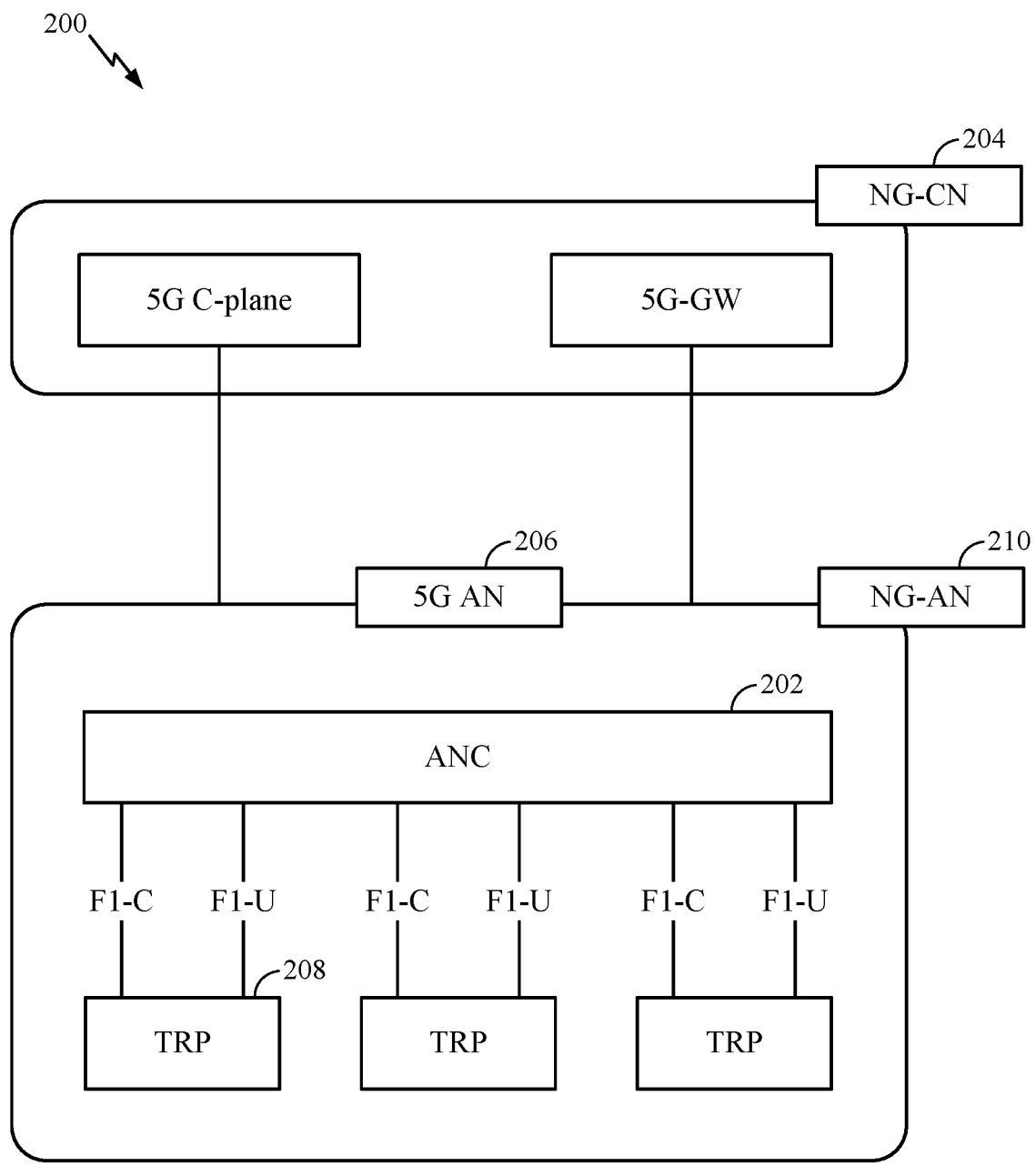
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific ANC deployments, the TRP may be connected to more than one ANC. A TRP may include one or more antenna ports. The TRPs may be configured to individually (e.g., dynamic selection) or jointly (e.g., joint transmission) serve traffic to a UE.

The logical architecture 200 may be used to illustrate fronthaul definition. The logical architecture 200 may support fronthauling solutions across different deployment types. For example, the logical architecture 200 may be based on transmit network capabilities (e.g., bandwidth, latency, and/or jitter).

The logical architecture 200 may share features and/or components with LTE. The next generation AN (NG-AN) 210 may support dual connectivity with NR. The NG-AN 210 may share a common fronthaul for LTE and NR.

The logical architecture 200 may enable cooperation between and among TRPs 208. For example, cooperation may be preset within a TRP and/or across TRPs via the ANC 202. There may be no inter-TRP interface.

Logical architecture 200 may have a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
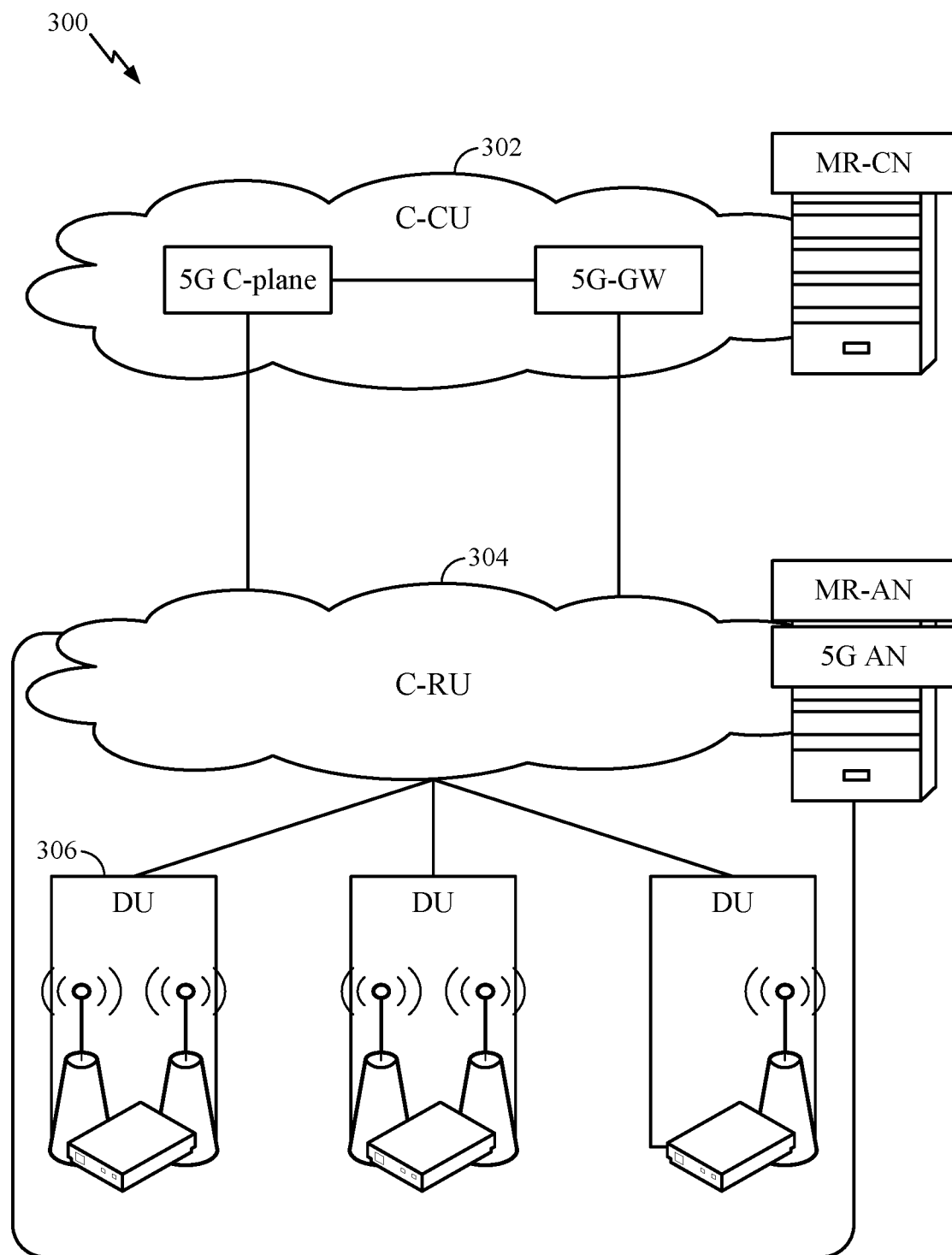
FIG. 3 is a diagram illustrating an example physical architecture of a distributed RAN, in accordance with certain aspects of the present disclosure.

FIG. 3 illustrates an example physical architecture 300 of a distributed RAN, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
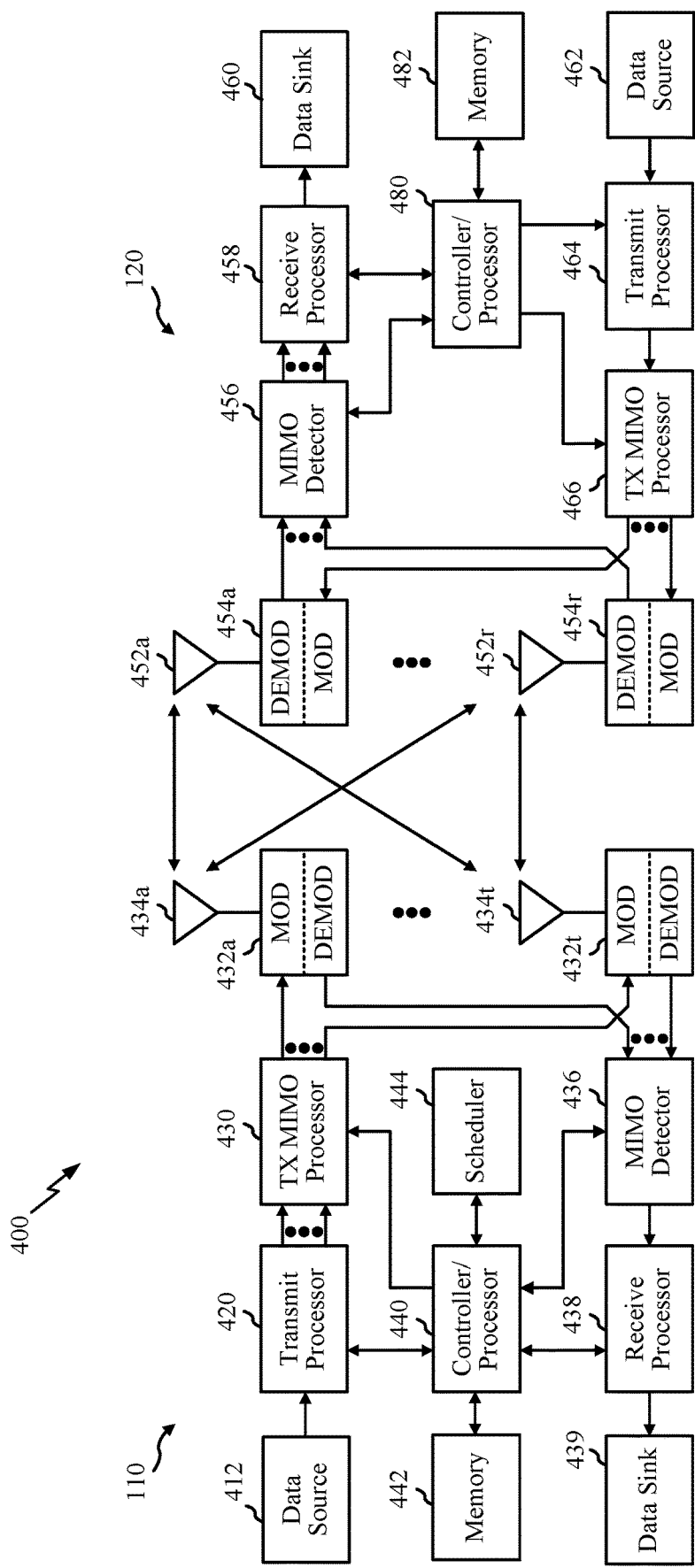
FIG. 4 is a block diagram conceptually illustrating a design of an example BS and user equipment (UE), in accordance with certain aspects of the present disclosure.

FIG. 4 illustrates example components of the BS 110 and UE 120 illustrated in FIG. 1, which may be used to implement aspects of the present disclosure. The BS may include a TRP and may be referred to as a Master eNB (MeNB) (e.g., Master BS, primary BS). Master BS and the Secondary BS may be geographically co-located.

One or more components of the BS 110 and UE 120 may be used to practice aspects of the present disclosure. For example, antennas 452, Tx/Rx 454, processors 466, 458, 464, and/or controller/processor 480 of the UE 120 and/or antennas 434, processors 420, 430, 438, and/or controller/processor 440 of the BS 110 may be used to perform operations described herein and complementary operations.

FIG. 4 shows a block diagram of a design of a BS 110 and a UE 120, which may be one of the BSs and one of the UEs in FIG. 1. For a restricted association scenario, the BS 110 may be the macro BS 110c in FIG. 1, and the UE 120 may be the UE 120y. The BS 110 may also be a BS of some other type. The BS 110 may be equipped with antennas 434a through 434t, and the UE 120 may be equipped with antennas 452a through 452r.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct, e.g., the execution of functional blocks illustrated herein, and/or other complementary processes for the techniques described herein. The memories 442 and 482 may store data and program codes for the BS 110 and the UE 120, respectively. A scheduler 444 may schedule UEs for data transmission on the downlink and/or uplink.

Figure 5:
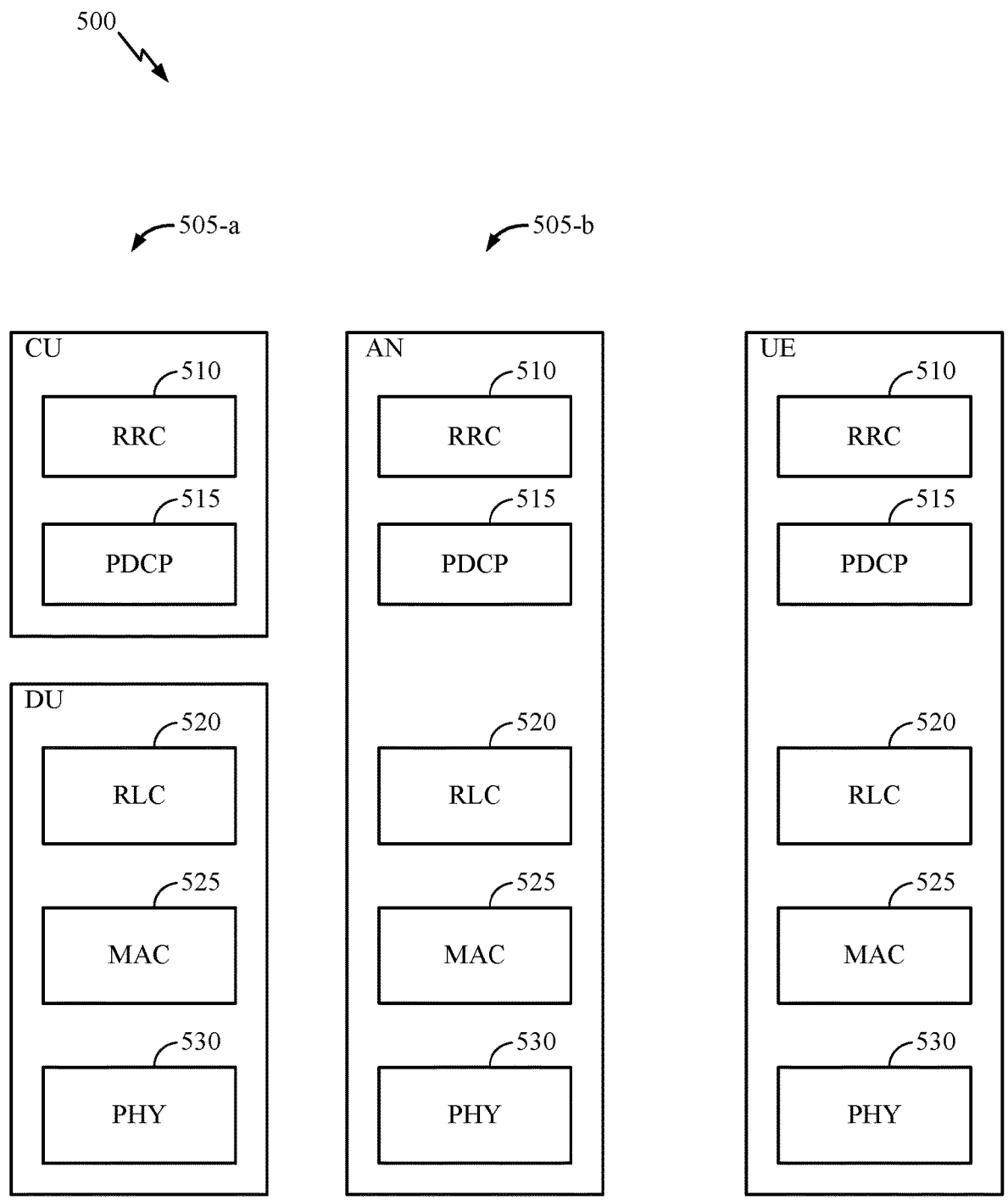
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
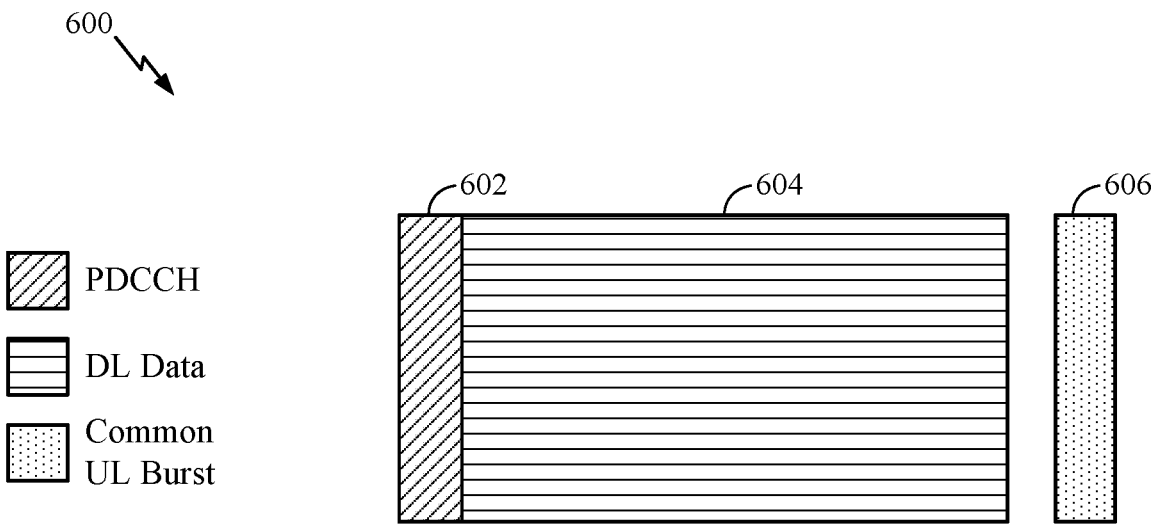
FIG. 6 illustrates an example of a DL-centric subframe, in accordance with certain aspects of the present disclosure.

FIG. 6 is a diagram showing an example of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe. In some configurations, the control portion 602 may be a physical DL control channel (PDCCH), as indicated in FIG. 6. The DL-centric subframe 600 may also include a DL data portion 604. The DL data portion 604 may be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
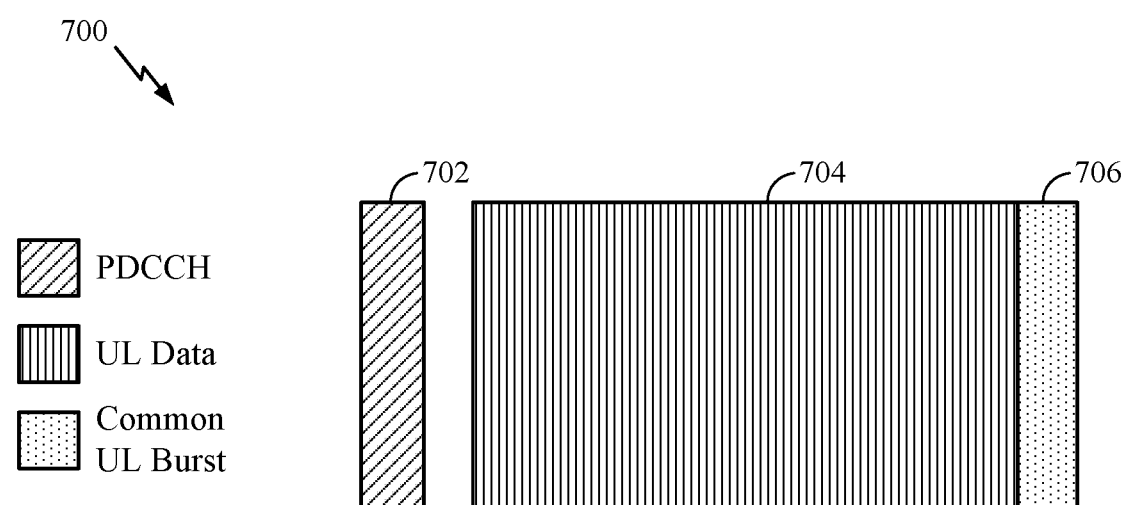
FIG. 7 illustrates an example of an UL-centric subframe, in accordance with certain aspects of the present disclosure.

FIG. 7 is a diagram showing an example of an UL-centric subframe 700. The UL-centric subframe 700 may include a control portion 702. The control portion 702 may exist in the initial or beginning portion of the UL-centric subframe. The control portion 702 in FIG. 7 may be similar to the control portion described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a physical UL control channel (PUCCH).

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Radio Link Monitoring

As discussed, a UE, such as UE 120 of FIG. 1, may be configured to perform RLM based on RLM RS transmitted from a BS, such as BS 110 of FIG. 1. Further, the UE 120 may be configured for DRX operation (e.g., by BS 110), as discussed. In certain aspects, the UE 120 may be configured to perform RLM based on the DRX configuration of the UE 120. For example, when the UE 120 can perform RLM may be based on both the periodicity with which the BS 110 transmits RLM RS, and the DRX cycles of the UE 120 when the UE 120 is in an ON state and able to receive the RLM RS.

In certain aspects, when the UE 120 is in a DRX mode operation, meaning it is performing DRX and not always in an ON state, the UE 120 may be configured to perform RLM and evaluate link quality between the UE 120 and BS 110 once every the longer of DRX cycle length or RLM RS period. For example, in LTE, UE 120 may normally be configured to perform RLM once every DRX cycle. However, in certain aspects described herein (such as for NR), UE 120 is configured to perform RLM and evaluate link quality between the UE 120 and BS 110 once every DRX cycle length or RLM RS period, whichever is longer. In certain aspects, if the RLM RS period is longer than the DRX cycle length, the UE 120 may be configured to perform RLM and evaluate link quality between the UE 120 and BS 110 once every configured multiple (e.g., 1, 2, 3, 4, . . . etc.) of an RLM RS period.

For example, if the DRX cycle length is longer than the RLM RS period, the UE 120 may be configured to perform RLM during the DRX cycle when RLM RS is transmitted by the BS 110. The transmission of RLM RS may coincide with when the UE 120 needs to be in the ON state, and the UE 120 in the ON State may then perform RLM. Alternatively, the transmission of RLM RS may coincide with when the UE 120 is permitted to be in the OFF state, and the UE 120 may then enter the ON state even though it is permitted to be in the OFF state, and perform RLM.

In another example, if the RLM RS period is longer than the DRX cycle length, the UE 120 may be configured to perform RLM during a period that it is both supposed to be in the ON state for a DRX cycle (or a period near where the UE 120 is supposed to be in the ON state for a DRX cycle) and that RLM RS is transmitted by the BS 110. If no such period exists, the UE 120 may enter the ON state even though it is permitted to be in the OFF state, and perform RLM.

In certain aspects, UE 120 may be configured to filter/combine/average multiple measurements of RLM RS separated by at least a configured time period to determine link quality when performing RLM. In certain aspects, the configured time period may be half of the greater of the RLM RS period (or configured multiple of the RLM RS period) and DRX cycle length.

In certain aspects, when the UE 120 is in a DRX mode operation, the UE 120 may be configured to perform RLM and evaluate link quality between the UE 120 and BS 110 once every DRX cycle that starts within a time-window of when the BS 110 is transmitting RLM RS. For example, every RLM RS period, the BS 110 may transmit RLM RS over a time period (e.g., number of subframes, slots, etc.) that is shorter than the RLM RS period. The time period over which the BS 110 is transmitting RLM RS may be referred to as a time-window of when the BS 110 is transmitting RLM RS. In certain aspects, in other words, the UE 120 may be configured to perform RLM at least once in every DRX cycle that coincides with transmission of RLM RS by BS 110.

In certain aspects, a DRX cycle starting within a time-window of when the BS 110 is transmitting RLM RS comprises the BS 110 transmitting RLM RS while the UE 120 is in an ON state of a DRX cycle. In certain aspects, more specifically, a DRX cycle starting within a time-window of when the BS 110 is transmitting RLM RS comprises the BS 110 transmitting RLM RS while the UE 120 is in an ON state of a DRX cycle due to a timer (e.g., on duration timer, inactivity timer, and/or DRX short cycle timer) of the DRX cycle having not yet expired at the UE 120 (e.g., the timer is still running).

In certain aspects, a DRX cycle starting within a time-window of when the BS 110 is transmitting RLM RS comprises the BS 110 starting transmission of RLM RS for an RLM RS period in a same time-window of when the DRX cycle starts. For example, the UE 120 may be configured to perform RLM during a DRX cycle that starts in the same time period (e.g., radio frame, subframe, slot, etc.) as the start of transmission of RLM RS for an RLM RS period by the BS 110.

In certain aspects, a DRX cycle starting within a time-window of when the BS 110 is transmitting RLM RS comprises the BS 110 transmitting RLM RS (e.g., at least a part of RLM RS transmitted for an RLM RS period) in a same time-window of when the DRX cycle starts. For example, the UE 120 may be configured to perform RLM during a DRX cycle that starts in the same time period (e.g., radio frame, subframe, slot, etc.) as there is a transmission of RLM RS by the BS 110.

In certain aspects, a DRX cycle starting within a time-window of when the BS 110 is transmitting RLM RS comprises the BS 110 transmitting RLM RS (e.g., at least a part of RLM RS transmitted for an RLM RS period) or starting transmission of RLM RS for an RLM RS period within a time-window of the start of the DRX cycle. For example, within a time-window of the start of the DRX cycle may refer to a time period from when the DRX cycle starts to another time period after the DRX cycle starts. In another example, within a time-window of the start of the DRX cycle may refer to a time period from before the DRX cycle starts to another time period after the DRX cycle starts. The UE 120 may be configured to perform RLM within the time-window of the start of the DRX cycle when the BS 110 is transmitting RLM RS (e.g., starts transmission of RLM RS, or transmits a part of RLM RS). If the BS 110 transmits RLM RS within the time-window, but before the start of the DRX cycle, the UE 120 may enter an ON state prior to the start of the DRX cycle to measure RLM RS.

In certain aspects, the UE 120 may be configured so that the start of a DRX cycle of the UE 120 is determined based on the RLM RS period and/or the start time of transmission of RLM RS by the BS 110. For example, BS 110 may configure UE 120 or the UE 120 may configure itself so the DRX cycle of the UE 120 coincides with the transmission of RLM RS by the BS 110. In one example, if the UE 120 has a first DRX configuration (e.g., as configured by BS 110, such as part of a RRC configuration) such that a DRX cycle of UE 120 starts at time n (e.g., slot n), and the BS 110 is configured to start transmitting RLM RS at time $n-n_0$, then the UE may determine to start its DRX cycle at time n instead of at time $n-n_0$. The BS 110 may also be configured to follow the same procedure to determine the start of UE 120's DRX cycle.

Figure 8:
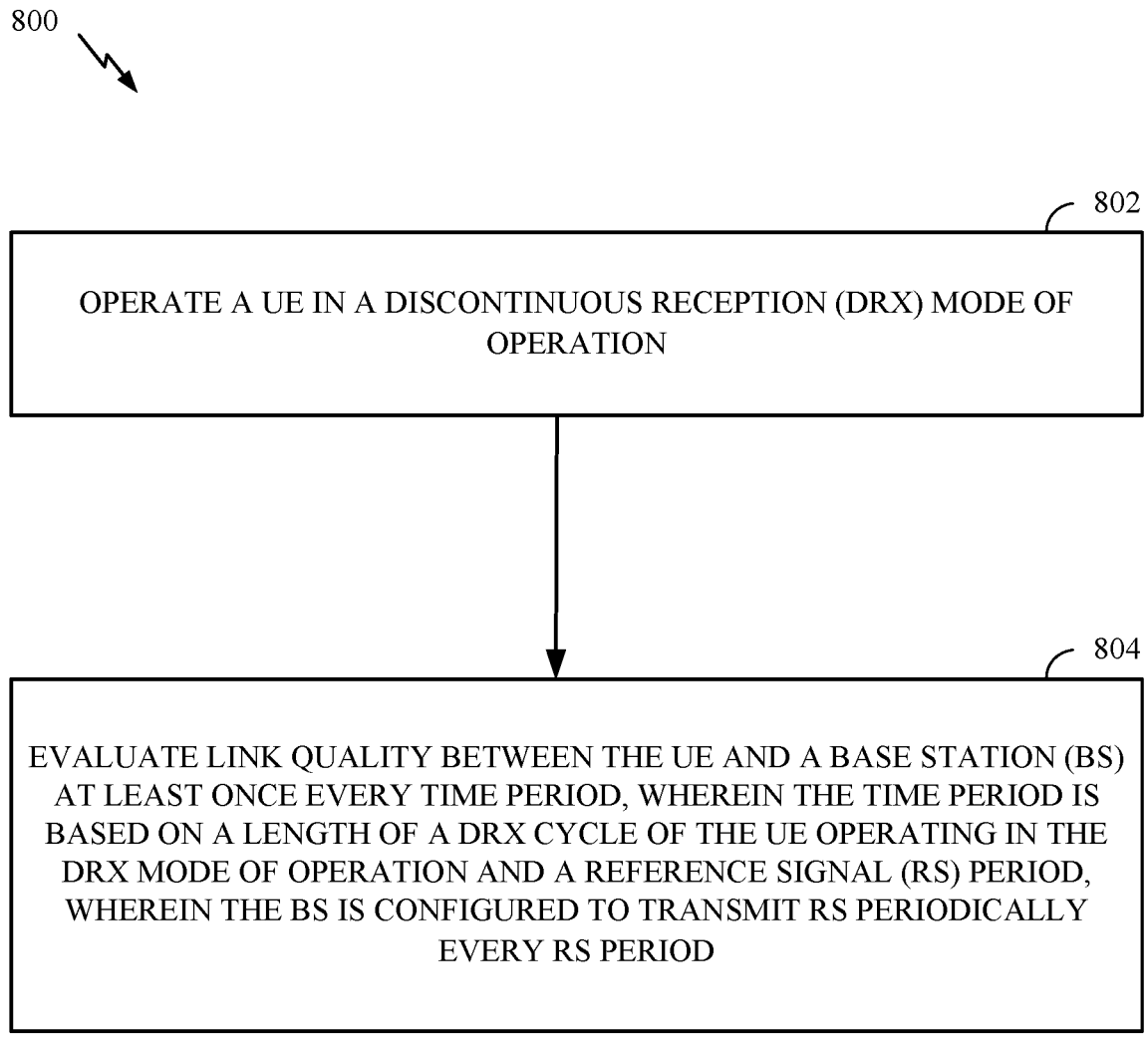
FIG. 8 illustrates example operations that may be performed by a wireless device such as a UE for performing radio link monitoring, in accordance with aspects of the present disclosure.

FIG. 8 illustrates example operations that may be performed by a wireless device such as a UE (e.g., UE 120) for performing radio link monitoring, in accordance with aspects of the present disclosure.

Operations 800 begin, at 802, by operating the UE in a discontinuous reception (DRX) mode of operation. At 804, the UE evaluates link quality between the UE and a base station (BS) at least once every time period, wherein the time period is based on a length of a DRX cycle of the UE operating in the DRX mode of operation and a reference signal (RS) period, wherein the BS is configured to transmit RS periodically every RS period.

Figure 9:
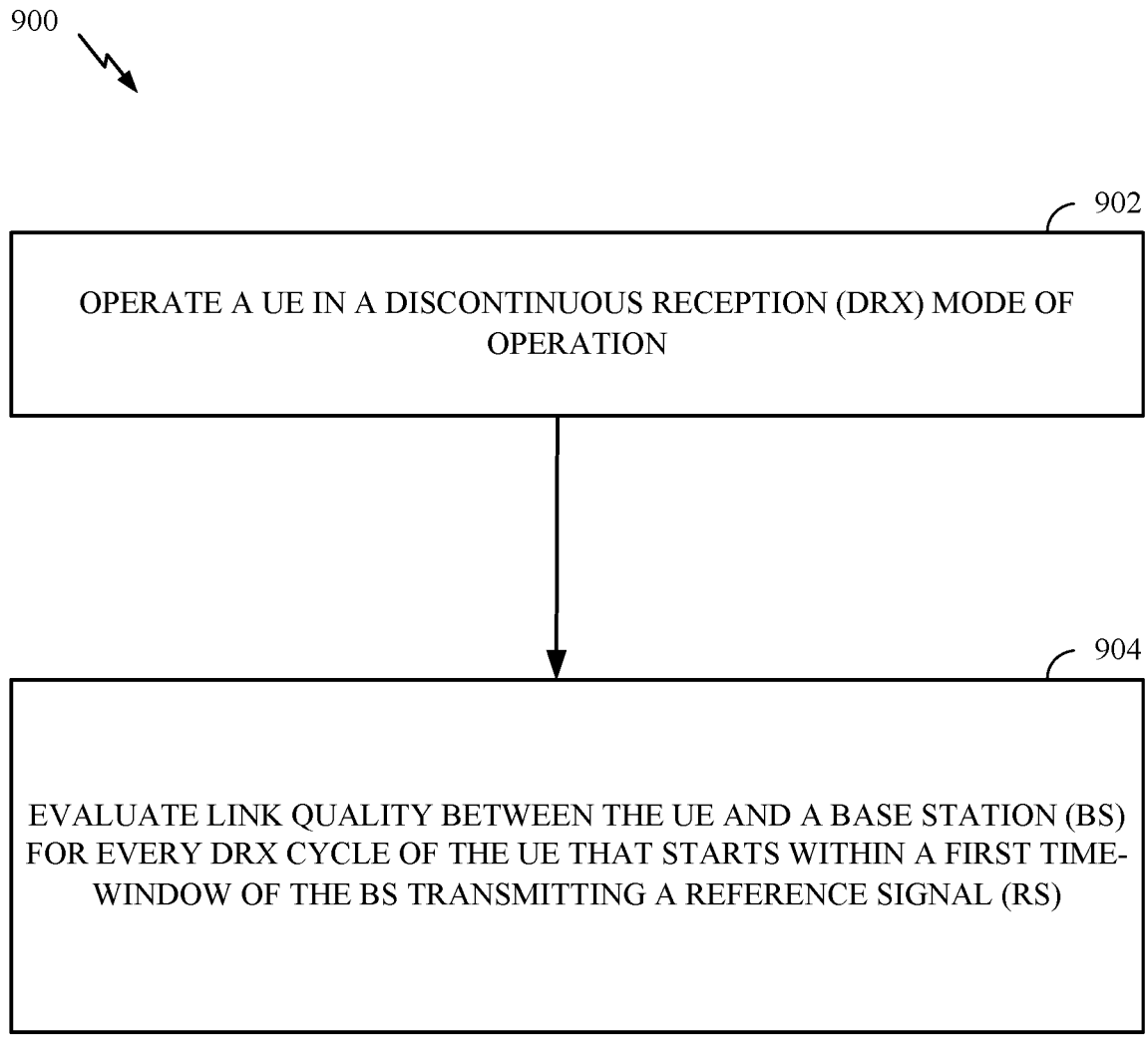
FIG. 9 illustrates example operations that may be performed by a wireless device such as a UE for performing radio link monitoring, in accordance with aspects of the present disclosure.

FIG. 9 illustrates example operations that may be performed by a wireless device such as a UE (e.g., UE 120) for performing radio link monitoring, in accordance with aspects of the present disclosure.

Operations 900 begin, at 902, by operating the UE in a discontinuous reception (DRX) mode of operation. At 904, the UE evaluates link quality between the UE and a base station (BS) for every DRX cycle of the UE that starts within a first time-window of the BS transmitting a reference signal (RS).

Figure 10:
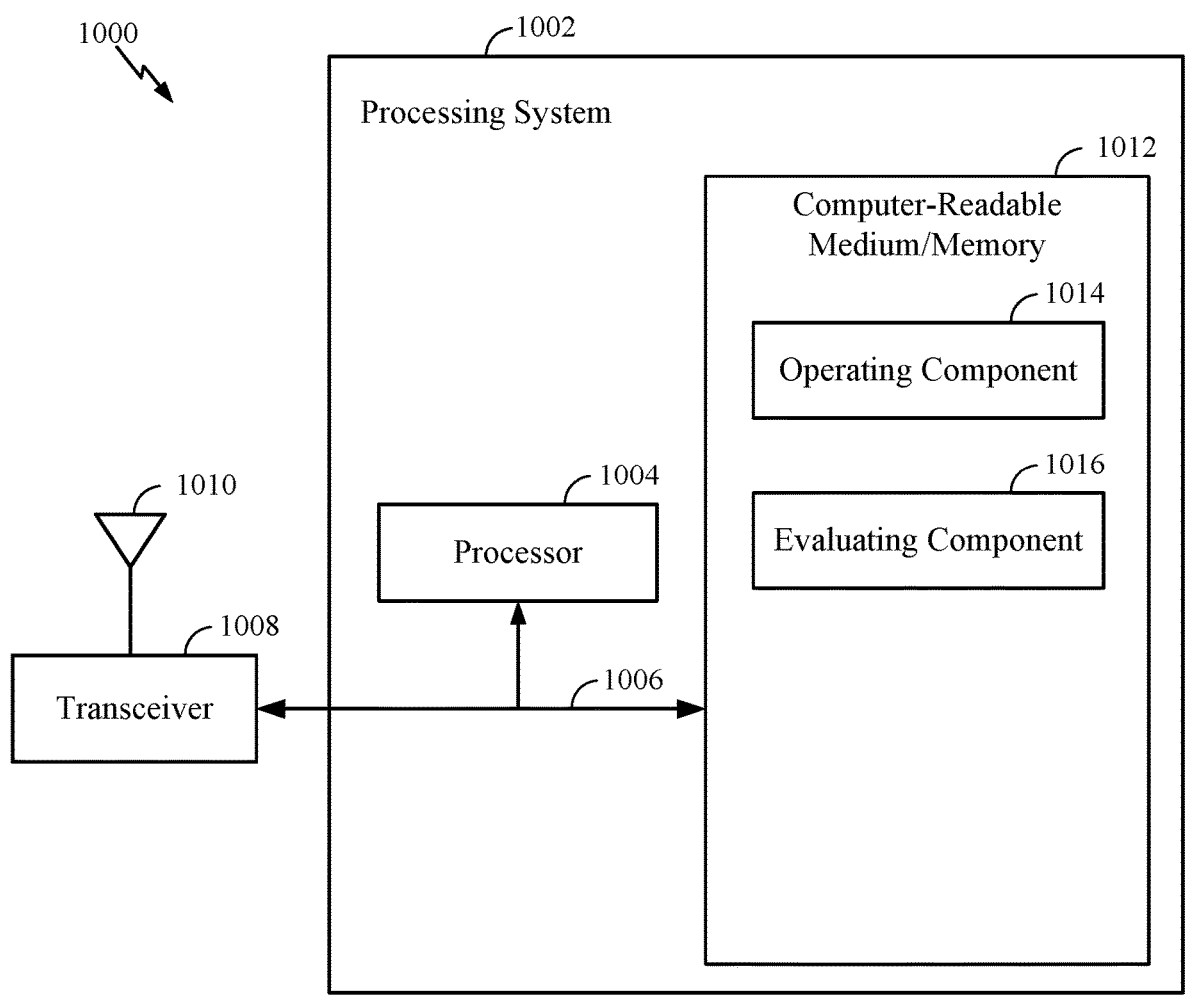
FIG. 10 illustrates a communications device that may include various components configured to perform operations for the techniques disclosed herein, such as the operations illustrated in FIGS. 8 and/or 9.

FIG. 10 illustrates a communications device 1000 that may include various components (e.g., corresponding to means-plus-function components) configured to perform operations for the techniques disclosed herein, such as the operations illustrated in FIGS. 8 and/or 9. The communications device 1000 includes a processing system 1002 coupled to a transceiver 1008. The transceiver 1008 is configured to transmit and receive signals for the communications device 1000 via an antenna 1010, such as the various signal described herein. The processing system 1002 may be configured to perform processing functions for the communications device 1000, including processing signals received and/or to be transmitted by the communications device 1000.

The processing system 1002 includes a processor 1004 coupled to a computer-readable medium/memory 1012 via a bus 1006. In certain aspects, the computer-readable medium/memory 1012 is configured to store instructions that when executed by processor 1004, cause the processor 1004 to perform the operations illustrated in FIGS. 8 and/or 9, or other operations for performing the various techniques discussed herein.

In certain aspects, the processing system 1002 further includes an operating component 1014 for performing the operations illustrated in 802 of FIG. 8 and/or 902 of FIG. 9. Additionally, the processing system 1002 includes an evaluating component 1016 for performing the operations illustrated in 804 of FIG. 8 and/or 904 of FIG. 9.

The operating component 1014 and evaluating component 1016 may be coupled to the processor 1004 via bus 1006. In certain aspects, the operating component 1014 and evaluating component 1016 may be hardware circuits. In certain aspects, the operating component 1014 and evaluating component 1016 may be software components that are executed and run on processor 1004.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one" of a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication, the method comprising:
    operating, at a user equipment (UE), in a discontinuous reception (DRX) mode of operation; and
    evaluating, by the UE, a link quality between the UE and a base station (BS) at least once every time period, wherein the time period is determined based on (i) a length of a DRX cycle of the UE operating in the DRX mode of operation and (ii) a reference signal (RS) period that indicates a periodicity of an RS transmission.

2. The method of claim 1, wherein the time period is the greater of the length of the DRX cycle and the RS period.

3. The method of claim 1, wherein the time period is the greater of the length of the DRX cycle and a multiple of the RS period.

4. The method of claim 1, wherein evaluating, by the UE, the link quality between the UE and the BS at least once every time period comprises measuring the RS transmitted by the BS at least twice by measuring a first RS transmitted by the BS and a second RS transmitted by the BS such that the first RS and the second RS are separated by at least half of the time period.

5. The method of claim 1, wherein the RS comprises one of a synchronization signal block (SSB), a secondary synchronization signal (SSS), a physical broadcast channel (PBCH) block, a demodulation reference signal (DMRS) of PBCH, or a channel state information reference signal (CSI-RS).

6. The method of claim 1, wherein evaluating the link quality comprises at least one of:
   measuring the RS transmitted by the BS at least once every time period to determine one or more measurements of a channel on which the RS is transmitted;
   determining whether a link between the UE and the BS is active or in a radio link failure state; or
   determining whether the UE is in-service or out-of-service with the BS.

7. The method of claim 1, further comprising, based on the evaluated link quality, one of:
   selectively initiating a cell search by the UE for connecting to another BS;
   selectively performing a cell reselection to connect to another BS; or
   selectively performing a handover to another BS.

8. The method of claim 1, wherein the DRX cycle comprises at least one of a short DRX cycle or a long DRX cycle.

9. The method of claim 1, wherein operating the UE in the DRX mode of operation comprises:
   operating the UE in an active state during one or more designated active periods of the DRX cycle; and
   operating the UE in the active state or one or more low power states during one or more designated sleep periods of the DRX cycle, wherein the UE evaluates the link quality in at least one of the one or more designated active periods or the one or more designated sleep periods.

10. A user equipment (UE) comprising:
    a memory; and
    a processor coupled to the memory, the processor being configured to:
       operate the UE in a discontinuous reception (DRX) mode of operation; and
       evaluate a link quality between the UE and a base station (BS) at least once every time period, wherein the time period is determined based on (i) a length of a DRX cycle of the UE operating in the DRX mode of operation and (ii) a reference signal (RS) period that indicates a periodicity of an RS transmission.

11. The UE of claim 10, wherein the time period is the greater of the length of the DRX cycle and the RS period.

12. The UE of claim 10, wherein the time period is the greater of the length of the DRX cycle and a multiple of the RS period.

13. The UE of claim 10, wherein to evaluate the link quality between the UE and the BS at least once every time period comprises to measure the RS transmitted by the BS at least twice by measuring a first RS transmitted by the BS and a second RS transmitted by the BS such that the first RS and the second RS are separated by at least half of the time period.

14. The UE of claim 10, wherein the RS comprises one of a synchronization signal block (SSB), a secondary synchronization signal (SSS), a physical broadcast channel (PBCH) block, a demodulation reference signal (DMRS) of PBCH, or a channel state information reference signal (CSI-RS).

15. The UE of claim 10, wherein to evaluate link quality comprises at least one of to:
    measure the RS transmitted by the BS at least once every time period to determine one or more measurements of a channel on which the RS is transmitted;
    determine whether a link between the UE and the BS is active or in a radio link failure state; or
    determine whether the UE is in-service or out-of-service with the BS.

16. The UE of claim 10, wherein the processor is further configured to, based on the evaluated link quality, one of:
    selectively initiate a cell search for connecting to another BS;
    selectively perform a cell reselection to connect to another BS; or
    selectively perform a handover to another BS.

17. The UE of claim 10, wherein the DRX cycle comprises at least one of a short DRX cycle or a long DRX cycle.

18. The UE of claim 10, wherein to operate the UE in the DRX mode of operation comprises to:
    operate the UE in an active state during one or more designated active periods of the DRX cycle; and
    operate the UE in the active state or one or more low power states during one or more designated sleep periods of the DRX cycle, wherein the processor evaluates the link quality in at least one of the one or more designated active periods or the one or more designated sleep periods.

19. A user equipment (UE) comprising:
    means for operating the UE in a discontinuous reception (DRX) mode of operation; and
    means for evaluating a link quality between the UE and a base station (BS) at least once every time period, wherein the time period is determined based on (i) a length of a DRX cycle of the UE operating in the DRX mode of operation and (ii) a reference signal (RS) period that indicates a periodicity of an RS transmission.

20. The UE of claim 19, wherein the time period is the greater of the length of the DRX cycle and the RS period.

21. The UE of claim 19, wherein the time period is the greater of the length of the DRX cycle and a multiple of the RS period.

22. The UE of claim 19, wherein means for evaluating, by the UE, the link quality between the UE and the BS at least once every time period comprises means for measuring the RS transmitted by the BS at least twice by measuring a first RS transmitted by the BS and a second RS transmitted by the BS such that the first RS and the second RS are separated by at least half of the time period.

23. The UE of claim 19, wherein the RS comprises one of a synchronization signal block (SSB), a secondary synchronization signal (SSS), a physical broadcast channel (PBCH) block, a demodulation reference signal (DMRS) of PBCH, or a channel state information reference signal (CSI-RS).

24. The UE of claim 19, wherein means for evaluating link quality comprises at least one of:
    means for measuring the RS transmitted by the BS at least once every time period to determine one or more measurements of a channel on which the RS is transmitted;
    means for determining whether a link between the UE and the BS is active or in a radio link failure state; or
    means for determining whether the UE is in-service or out-of-service with the BS.

25. A non-transitory computer readable storage medium that stores instructions that when executed by a user equipment (UE) cause the UE to perform a method for wireless communication, the method comprising:
    operating, at the UE, in a discontinuous reception (DRX) mode of operation; and evaluating, by the UE, a link quality between the UE and a base station (BS) at least once every time period, wherein the time period is determined based on (i) a length of a DRX cycle of the UE operating in the DRX mode of operation and (ii) a reference signal (RS) period that indicates a periodicity of an RS transmission.

26. The non-transitory computer readable storage medium of claim 25, wherein the time period is the greater of the length of the DRX cycle and the RS period.

27. The non-transitory computer readable storage medium of claim 25, wherein the time period is the greater of the length of the DRX cycle and a multiple of the RS period.

28. The non-transitory computer readable storage medium of claim 25, wherein evaluating, by the UE, the link quality between the UE and the BS at least once every time period comprises measuring the RS transmitted by the BS at least twice by measuring a first RS transmitted by the BS and a second RS transmitted by the BS such that the first RS and the second RS are separated by at least half of the time period.

29. The non-transitory computer readable storage medium of claim 25, wherein the RS comprises one of a synchronization signal block (SSB), a secondary synchronization signal (SSS), a physical broadcast channel (PBCH) block, a demodulation reference signal (DMRS) of PBCH, or a channel state information reference signal (CSI-RS).

30. The non-transitory computer readable storage medium of claim 25, wherein evaluating the link quality comprises at least one of:
    measuring the RS transmitted by the BS at least once every time period to determine one or more measurements of a channel on which the RS is transmitted;
    determining whether a link between the UE and the BS is active or in a radio link failure state; or
    determining whether the UE is in-service or out-of-service with the BS.

* * * * *